US012698456B2

(12) United States Patent
Kropf et al.

(10) Patent No.: US 12,698,456 B2
(45) Date of Patent: Aug. 4, 2026

(54) N-SUBSTITUTED 2-(6-HYDROXY-3-OXO-3H-XANTHENE-9-YL)BENZAMIDES AS PHOTOACTIVATORS IN DETERGENTS

(71) Applicant: HENKEL AG & CO. KGAA, Düsseldorf (DE)

(72) Inventors: Christian Kropf, Hilden (DE); Nadia Ledermann, Duisburg (DE)

(73) Assignee: HENKEL AG & CO. KGAA, Düsseldorf (DE)

( * ) Notice: Subject to any disclaimer, the term of this patent is extended or adjusted under 35 U.S.C. 154(b) by 142 days.

(21) Appl. No.: 18/290,542

(22) PCT Filed: Nov. 23, 2022

(86) PCT No.: PCT/EP2022/082893

§ 371 (c)(1),
(2) Date: Nov. 14, 2023

(87) PCT Pub. No.: WO2023/099294

PCT Pub. Date: Jun. 8, 2023

(65) Prior Publication Data

US 2024/0263103 A1 Aug. 8, 2024

(30) Foreign Application Priority Data

Dec. 3, 2021 (DE) ..................... 10 2021 213 793.8

(51) Int. Cl.

| | |
|---|---|
| ***C11D 3/00*** | (2006.01) |
| ***C11D 3/20*** | (2006.01) |
| ***C11D 3/395*** | (2006.01) |
| ***C11D 17/04*** | (2006.01) |

(52) U.S. Cl.
CPC .......... *C11D 3/3951* (2013.01); *C11D 3/2096* (2013.01); *C11D 17/043* (2013.01); *C11D 2111/12* (2024.01)

(58) Field of Classification Search
CPC ... C11D 3/3951; C11D 3/2096; C11D 17/043; C11D 2111/12; C11D 3/0063; C11D 3/3955
USPC .......................................... 510/301; 549/223
See application file for complete search history.

(56) References Cited

U.S. PATENT DOCUMENTS

| | | | | |
|---|---|---|---|---|
| 4,668,418 A | 5/1987 | Ricchiero | | |
| 6,130,101 A * | 10/2000 | Mao | C09B 11/08 | 544/70 |
| 2004/0054195 A1* | 3/2004 | Gao | C07D 311/84 | 549/223 |
| 2006/0097248 A1* | 5/2006 | Lee | B82Y 10/00 | 549/385 |

FOREIGN PATENT DOCUMENTS

| | | | |
|---|---|---|---|
| WO | WO 2018191594 A1 * | 10/2018 | A61K 31/352 |
| WO | WO 2019204270 A1 * | 10/2019 | A61K 41/0033 |
| WO | 2019240981 A1 | 12/2019 | |

OTHER PUBLICATIONS

STIC Search Report dated Nov. 17, 2025.*
Journal of Applied Spectroscopy, vol. 52, No. 2, Feb. 1, 1990 pp. 158-163.*
Bystryak et al., "Luminescence study of intermolecular interactions between excited octadecyleosinamide molecules and solvent molecules in polar and nonpolar solvents," Journal of Applied Spectroscopy, vol. 52, No. 2; Feb. 1, 1990; pp. 158-163.
International Search Report and Written Opinion for the corresponding International Application No. PCT/EP2022/082893; Date of Mailing: Apr. 17, 2023; 12 pages, with English translation.

* cited by examiner

*Primary Examiner* — Eisa B Elhilo
(74) *Attorney, Agent, or Firm* — CANTOR COLBURN LLP

(57) ABSTRACT

N-substituted 2-(6-hydroxy-3-oxo-3H-xanthen-9-yl) benzamides are capable of generating bleach-active species when irradiated with visible light, these species leading to an enhanced bleaching power during the washing of textiles.

20 Claims, No Drawings

N-SUBSTITUTED 2-(6-HYDROXY-3-OXO-3H-XANTHENE-9-YL)BENZAMIDES AS PHOTOACTIVATORS IN DETERGENTS

CROSS-REFERENCE TO RELATED APPLICATIONS

This application is a National Stage application of PCT/EP2022/082893, filed Nov. 23, 2022, which claims benefit of German Patent Application No. 10 2021 213 793.8 filed on Dec. 3, 2021, both of which are incorporated by reference herein in their entirety.

The present invention relates to the use of N-alkyl-substituted 2-(6-hydroxy-3-oxo-3H-xanthen-9-yl) benzamides as photobleaching agents for removing stains from textile materials, and washing agents containing such photobleaching agents, and to a method for removing stains from textile materials using N-alkyl substituted 2-(6-hydroxy-3-oxo-3H-xanthen-9-yl) benzamides in an aqueous washing liquid under light irradiation.

In addition to removing odors and optionally scenting the textiles, the washing of textiles generally serves primarily to remove stains of various kinds. This cleaning effect is supported by the input of bleaches, surfactants and builders to the washing liquor, wherein a significant proportion of the removal in particular of colored stains is added to the bleaching agent. In addition to reductive bleaches that are of only slight importance, peroxygen compounds are generally used as bleaching agents, the oxidative bleaching performance of which is conventionally intensified by so-called bleach activators which, for example, form percarboxylic acids, such as peracetic acid, by the perhydrolysis of carboxylic acid derivatives, such as TAED, which are more strongly oxidizing than the starting peroxygen compound. A plurality of metal complexes is also capable of increasing the bleaching performance of peroxygen compounds.

Alternatively, it has been proposed to form bleach-active species during the washing process by irradiating compounds which pass through the irradiation in photoexcited states, which are more reactive than the basic state. For example, it is known from WO 98/32826 A1 and the prior art cited therein that certain water-soluble phthalocyanine, naphthocyanine and metallocyanine compounds can be used as photobleaching agents.

One disadvantage of such photobleaching agents, which are also referred to synonymously as photoactivators, is the need for the action of high-energy electromagnetic radiation, such as UV radiation, to form the bleach-active species.

Surprisingly, it has been found that certain 2-(6-hydroxy-3-oxo-3H-xanthen-9-yl) benzamide derivatives can achieve this when irradiated with visible light.

A first subject matter of the invention is the use of N-alkyl-substituted 2-(6-hydroxy-3-oxo-3H-xanthen-9-yl) benzamides having the general formula (I), (I)

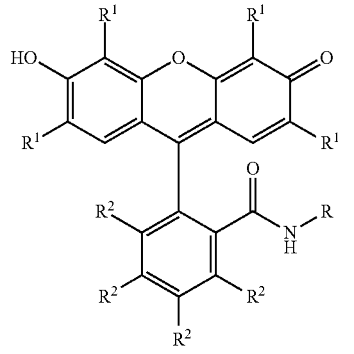

where R is an optionally substituted linear or branched alkyl radical having 1 to 20 C atoms, preferably 8 to 16 C atoms, each $R^1$ independently is F, Cl, Br or I, and each $R^2$ independently is H, F, Cl, Br or I, and each $R^2$, as photobleaching agent to remove stains from textile materials.

The stains are preferably those which contain polymerizable substances, in particular polymerizable dyes, wherein the polymerizable dyes are preferably polyphenolic dyes, in particular flavonoids, primarily anthocyanidins or anthocyanins or oligomers of these compounds. The stains are likewise preferably those which contain carotenoids and/or chlorophylls, i.e., dyes based on the porphyrin ring, as dyes. In addition to the removal of green, yellow, red or blue-colored stains, the removal of stains in intermediate colors, in particular violet, lilac, brown, purple or pink is also possible, as is the removal of stains in shades of green, yellow, red, violet, lilac, brown, purple, pink or blue, without substantially consisting of this color themselves. The colors mentioned can also be in particular light or dark in each case. These are preferably stains, in particular grass, fruit or vegetable stains, in particular also stains from food products, such as for example spices, sauces, chutneys, curries, purees and jams, or beverages, for example coffee, tea, wine and juice, which contain corresponding green, yellow, red, violet, lilac, brown, purple, pink, and/or blue dyes. The stains to be removed according to the invention can be caused in particular by cherries, morellos, grapes, apples, pomegranates, chokeberries, plums, seaberries, açai berries, kiwis, mangoes, grass or berries, in particular redcurrants, blackcurrants, elderberries, blackberries, raspberries, blueberries, lingonberries, cranberries, strawberries or bilberries, or by coffee, tea, red cabbage, blood orange, eggplant, tomato, carrot, beetroot, spinach, bell pepper, red or blue potato or red onion.

If the radical R in the compounds of the general formula (I) is substituted, it preferably carries substituents selected from —OH, —$COO^-M^+$, —$SO_3^-M_+$, —$OSO_3^-M^+$, —$N^+(CH_2CH_3)_3Hal^-$ and mixtures thereof, where $Hal^-$ is $Cl^-$, $Br^-$, $J^-$, $F^-$ and mixtures thereof and $M^+$ and $Hal^-$ can also be missing if —$COO^-$, —$SO_3^-$, —$OSO_3^-$ and —$N^+(CH_2CH_3)_3$ are present in a charge-balancing amount; it is also preferred if at least 1 substituent is terminal. In the compounds of the general formula (I), preferably all radicals $R^1$ are the same and represent in particular Br. In the compounds of the general formula (I), preferably all radicals $R^2$ are the same and represent in particular H.

The N-alkyl-substituted 2-(6-hydroxy-3-oxo-3H-xanthen-9-yl) benzamides mentioned can be used according to the invention as such or in the form of washing agents which contain them and optionally further conventional washing agent ingredients.

A second subject matter of the invention is therefore a washing agent containing an N-alkyl-substituted 2-(6-hydroxy-3-oxo-3H-xanthen-9-yl) benzamide as defined above. Preferably, the washing agent contains 0.00001 wt. % to 1 wt. %, in particular 0.001 wt. % to 0.1 wt. % N-alkyl-substituted 2-(6-hydroxy-3-oxo-3H-xanthen-9-yl) benzamide.

A further subject matter is a method for removing stains from textile materials using the N-alkyl-substituted 2-(6-hydroxy-3-oxo-3H-xanthen-9-yl) benzamides defined above in an aqueous washing liquid in which the stained textile materials, which are in need of washing, are located, while irradiating the aqueous washing liquid with visible light.

Visible light here is to be understood to mean electromagnetic radiation visible to the human eye, the wavelength of which is in the range from 400 nm to 780 nm. Within the scope of the present invention, light in the wavelength range from 400 nm to 600 nm, in particular from 450 nm to 525 nm, is preferably used. This can be daylight or sunlight, or artificially generated light, the latter preferably being produced with the aid of an LED illuminant. In the context of the method according to the invention, the light acts on the washing liquid in which the stained textile materials, which are in need of washing, and the active ingredient defined above are located. This can be done, for example, by manually performing the washing process in an open container, the opening of which is exposed to natural daylight or sunlight. The use of a conventional washing machine is also possible if it has a so-called porthole through which light enters the interior of the machine and reaches the washing liquid located therein. The use of alternative light sources, for example of LEDs, is also possible, wherein when a washing machine is in use, the light source is preferably arranged in the interior of the machine in such a way that it irradiates the washing liquid at least periodically, for example during the recirculation thereof. In the latter variant, it is also possible to not operate the light source over the entire period of the washing process, but only for a part thereof, so that the oxidative bleaching takes place only during this subperiod.

In the context of the use according to the invention and of the method according to the invention, it is preferred to use said N-alkyl-substituted 2-(6-hydroxy-3-oxo-3H-xanthen-9-yl) benzamide in concentrations in the range from 0.0001 mmol/l to 0.1 mmol/l, in particular from 0.001 mmol/l to 0.01 mmol/l in aqueous washing liquids. It is also preferred that the washing liquid has a basic pH value, which is in particular in the range from pH 7 to pH 9.

The washing agent can be present in any dosage form established according to the prior art and/or in any expedient dosage form. These include, for example, solid, powdery, liquid, gel-like or pasty dosage forms, optionally also consisting of several phases; also included are, for example, extrudates, granules, tablets or pouches, packed both in large containers and in portions. In a preferred embodiment, the agent is liquid.

The method according to the invention is carried out and the use according to the invention is performed in a respectively preferred embodiment by the use of a washing and cleaning agent according to the invention which does not contain any bleaching agents. This means that the agent does not contain any bleaching agents in the narrower sense, that is, hypochlorites or peroxygen compounds.

In a particularly preferred embodiment, the washing agent is a liquid textile washing agent.

Beyond the N-alkyl-substituted 2-(6-hydroxy-3-oxo-3H-xanthen-9-yl) benzamide that is substantial to the invention, washing agents according to the invention can contain other typical constituents of textile washing agents, in particular selected from the group of builders, surfactants, polymers, enzymes, fragrances and perfume carriers.

The builders include in particular zeolites, silicates, carbonates, organic cobuilders, and—if there is no ecological concern about their use-phosphates as well.

The finely crystalline, synthetic and bound water-containing zeolite is preferably zeolite A and/or zeolite P. Zeolite MAC® (commercial product from Crosfield) is suitable as zeolite P. However, zeolite X and mixtures of zeolite A, X and/or P are also available commercially and, in the context of the present invention, a co-crystallizate of zeolite X and zeolite A (about 80 wt. % zeolite X), which is represented by the formula $$n\,Na_2O\cdot(1-n)K_2O\cdot Al_2O_3\cdot(2-2.5)SiO_2\cdot(3.5-5.5)H_2O,$$

can also be used. In this case, the zeolite can be used both as a builder in a granular compound and also as a kind of "depowdering" of a granular mixture, preferably a mixture to be pressed, wherein both ways of incorporating the zeolite into the premix are typically used. Suitable zeolites may have an average particle size of less than 10 μm (volume distribution; measuring method: Coulter counter) and preferably contain from 18 wt. % to 22 wt. %, and in particular from 20 wt. % to 22 wt. %, of bound water.

Crystalline layered silicates of the general formula $NaMSi_xO_{2x+1}\cdot y\ H_2O$ may also be used, where M is sodium or hydrogen, x is a number from 1.9 to 22, preferably from 1.9 to 4, wherein 2, 3, or 4 are particularly preferred values for x, and y is a number from 0 to 33, preferably from 0 to 20. The crystalline layered silicates of the formula $NaMSi_xO_{2x+1}\cdot y\ H_2O$ are sold, for example, by Clariant GmbH (Germany) under the trade name Na—SKS. Examples of these silicates are Na—SKS-1 ($Na_2Si_{22}O_{45}\cdot x\ H_2O$, kenyaite), Na—SKS-2 ($Na_2Si_{14}O_{29}\cdot x\ H_2O$, magadiite), Na—SKS-3 ($Na_2Si_8O_{17}\cdot x\ H_2O$) or Na—SKS-4 ($Na_2Si_4O_9\cdot x\ H_2O$, macatite).

Crystalline sheet silicates of the formula $NaMSi_xO_{2x-1}\cdot y\ H_2O$, where x is 2, are preferred. In particular, both β- and δ-sodium disilicates $Na_2Si_2O_5\cdot y\ H_2O$ and, above all, Na—SKS-5 (α-$Na_2Si_2O_5$), Na—SKS-7 (β-$Na_2Si_2O_5$, natrosilite), Na—SKS-9 ($NaHSi_2O_5\cdot H_2O$), Na—SKS-10 ($NaHSi_2O_5\cdot 3\ H_2O$, kanemite), Na—SKS-11 (t-$Na_2Si_2O_5$) and Na—SKS-13 ($NaHSi_2O_5$), but in particular Na—SKS-6 (δ-$Na_2Si_2O_5$) are preferred. Detergents preferably contain a proportion by weight of the crystalline layered silicate of the formula $NaMSi_xO_{2\times1}\cdot y\ H_2O$ from 0.1 wt. % to 20 wt. %, preferably from 0.2 wt. % to 15 wt. %, and in particular from 0.4 wt. % to 10 wt. %.

It is also possible to use amorphous sodium silicates with an $Na_2O:SiO_2$ modulus of from 1:2 to 1:3.3, preferably from 1:2 to 1:2.8, and in particular from 1:2 to 1:2.6, which preferably exhibit retarded dissolution and secondary washing properties. The retarded dissolution compared to conventional amorphous sodium silicates can have been caused in a variety of ways, for example by way of surface treatment, compounding, compacting/compression or overdrying. The term "amorphous" is understood to mean that the silicates do not supply any sharp X-ray reflexes in X-ray diffraction experiments, such as those that are typical of crystalline substances, but at best cause one or more maxima of the scattered X-rays, which have a width of several degree units of the diffraction angle.

Alternatively or in combination with the aforementioned amorphous sodium silicates, x-ray amorphous silicates can be used, the silicate particles of which provide washed-out or even sharp diffraction maxima in electron diffraction experiments. This is to be interpreted such that the products comprise microcrystalline regions measuring ten to several hundred nm, wherein values of up to a maximum of 50 nm, and in particular up to a maximum of 20 nm, are preferred. Such X-ray amorphous silicates likewise have a dissolution delay compared to conventional soluble glasses. Compressed/compacted amorphous silicates, compounded amorphous silicates and overdried X-ray amorphous silicates are particularly preferred.

This/these silicate(s), preferably alkali silicates, particularly preferably crystalline or amorphous alkali disilicates, if present, are contained in washing agents in amounts of 3 wt. % to 60 wt. %, preferably 8 wt. % to 50 wt. %, and in particular 20 wt. % to 40 wt. %.

It is also possible to use the generally known phosphates as builder substances, provided that such use should not be avoided for ecological reasons. Amongst the plurality of commercially available phosphates, the alkali metal phosphates, with a particular preference for pentasodium phosphate and pentapotassium phosphate (sodium polyphosphate and potassium polyphosphate), are the most important in the washing and cleaning agent industry. Alkali metal phosphate is the summary name for the alkali metal (in particular sodium and potassium) salts of the various phosphoric acids, in which metaphosphoric acids $(HPO_3)_n$ and orthophosphoric acid $H_3PO_4$ can be distinguished in addition to higher molecular weight representatives. The phosphates combine several benefits: They act as alkali carriers, prevent limescale deposits on machine parts and lime incrustations in fabrics and also contribute to cleaning performance. Technically particularly important phosphates are pentasodium triphosphate, $Na_5P_3O_{10}$ (sodium tripolyphosphate) and the corresponding potassium salt pentapotassium triphosphate, $K_5P_3O_{10}$ (potassium tripolyphosphate). Preference is furthermore given to using sodium potassium tripolyphosphates. If phosphates are used in washing agents, preferred agents contain this/these phosphate(s), preferably alkali metal phosphate(s), particularly preferably pentasodium or pentapotassium triphosphate (sodium or potassium tripolyphosphate), in amounts of 5 wt. % to 80 wt. %, preferably of 15 wt. % to 75 wt. %, and in particular of 20 wt. % to 70 wt. %.

Alkali carriers can also be used. Alkali carriers include, for example, alkali metal hydroxides, alkali metal carbonates, alkali metal hydrogen carbonates, alkali metal sesquicarbonates, the aforementioned alkali silicates, alkali metasilicates, and mixtures of the aforementioned substances, wherein the alkali carbonates, in particular sodium carbonate, sodium hydrogen carbonate or sodium sesquicarbonate, can preferably be used. A builder system containing a mixture of tripolyphosphate and sodium carbonate may be particularly preferred. Due to their low chemical compatibility with the other ingredients of washing agents compared to other builder substances, the alkali metal hydroxides are typically only used in small amounts, preferably in amounts below 10 wt. %, preferably below 6 wt. %, particularly preferably below 4 wt. % and in particular below 2 wt. %, based in each case on the total weight of the automatic dishwashing washing agent. Agents which, based on the total weight thereof, contain less than 0.5 wt. % and in particular no alkali metal hydroxides are particularly preferred. It is particularly preferred to use carbonate(s) and/or hydrogen carbonate(s), preferably alkali carbonate(s), particularly preferably sodium carbonate, in amounts of from 2 to 50 wt. %, preferably from 5 to 40 wt. %, and in particular from 7.5 to 30 wt. %.

Polycarboxylates/polycarboxylic acids, polymeric polycarboxylates, aspartic acid, polyacetals, dextrins, and phosphonates are particularly noteworthy as organic builders. For example, the polycarboxylic acids that can be used in the form of the free acids and/or the sodium salts thereof are usable, wherein polycarboxylic acids shall be understood to mean those carboxylic acids that carry more than one acid function. These include, for example, citric acid, adipic acid, succinic acid, glutaric acid, malic acid, tartaric acid, maleic acid, fumaric acid, saccharic acids, aminocarboxylic acids, nitrilotriacetic acid (NTA), provided that the use thereof is not objectionable for ecological reasons, and mixtures thereof. In addition to their builder effect, the free acids typically also have the property of being an acidification component and are thus also used for setting a lower and milder pH of washing agents. Particularly noteworthy here are citric acid, succinic acid, glutaric acid, adipic acid, gluconic acid, and any mixtures thereof. Builders moreover include polymeric polycarboxylates. These are, for example, the alkali metal salts of polyacrylic acid or of polymethacrylic acid, e.g., those having a relative molecular mass from 500 g/mol to 70000 g/mol. Polyacrylates, which preferably have a molecular mass of from 1,000 to 20,000 g/mol, are particular suitable. Due to their superior solubility, short-chain polyacrylates having molar masses from 2000 g/mol to 10000 g/mol, and particularly preferably from 3000 g/mol to 5000 g/mol, may in turn be preferred from this group. In addition, copolymeric polycarboxylates are suitable, in particular those of acrylic acid with methacrylic acid and those of acrylic acid or methacrylic acid with maleic acid. Copolymers of acrylic acid with maleic acid which contain 50 wt. % to 90 wt. % acrylic acid and 50 wt. % to 10 wt. % maleic acid have been found to be particularly suitable. The relative molecular mass thereof, based on free acids, is generally from 2,000 g/mol to 70,000 g/mol, preferably from 20,000 g/mol to 50,000 g/mol, and in particular from 30,000 g/mol to 40,000 g/mol. To improve water solubility, the polymers can also contain allyl sulfonic acids, such as allyloxybenzene sulfonic acid and methallyl sulfonic acid, as monomers. The (co)polymeric polycarboxylates may be used as a solid or in an aqueous solution. The content of (co)polymeric polycarboxylates in the washing agent is preferably from 0.5 wt. % to 20 wt. %, in particular from 3 wt. % to 10 wt. %.

Biodegradable polymers composed of more than two different monomer units are also particularly preferred, for example those that contain salts of acrylic acid and of maleic acid, and vinyl alcohol or vinyl alcohol derivatives as monomers, or those that contain salts of acrylic acid and of 2-alkylallylsulfonic acid and sugar derivatives as monomers. Further preferred copolymers are such that contain acrolein and acrylic acid/acrylic acid salts or acrolein and vinyl acetate as monomers. Polymeric aminodicarboxylic acids, the salts thereof or the precursors thereof should likewise be mentioned as further preferred builders. Particular preference is given to polyaspartic acids and/or salts thereof.

A further class of substances having builder properties is phosphonates. These are the salts of, in particular, hydroxyalkane or aminoalkane phosphonic acids. Among the hydroxyalkane phosphonic acids, 1-hydroxyethane-1,1-diphosphonic acid (HEDP) is of particular importance. It is in particular used as a sodium salt, the disodium salt reacting in a neutral manner and the tetrasodium salt reacting in an alkaline manner. In particular, ethylenediamine tetramethylene phosphonic acid (EDTMP), diethylenetriamine pentamethylene phosphonic acid (DTPMP) and higher homologs thereof can be considered as aminoalkane phosphonic acids. They are used in particular in the form of the neutral-reacting sodium salt, for example as the hexasodium salt of EDTMP or as the heptasodium and octasodium salt of DTPMP. Mixtures of the stated phosphonates can also be used as organic builders. In particular, the aminoalkane phosphonates also have a pronounced capability to bind heavy metals.

Further suitable builders are polyacetals which can be obtained by reacting dialdehydes with polyol carboxylic acids having 5 to 7 C atoms and at least 3 hydroxyl groups. Preferred polyacetals are obtained from dialdehydes, such as glyoxal, glutaraldehyde, terephthalaldehyde and mixtures thereof, and from polyol carboxylic acids, such as gluconic acid and/or glucoheptonic acid.

Further suitable organic builders are dextrins, for example oligomers or polymers of carbohydrates, which can be obtained by the partial hydrolysis of starches. The hydrolysis can be carried out according to customary methods, for example acid- or enzyme-catalyzed methods. These dextrins are preferably hydrolysis products having an average molar mass in the range of from 400 g/mol to 500,000 g/mol. In this case, a polysaccharide having a dextrose equivalent (DE) in the range of from 0.5 to 40, in particular from 2 to 30, is preferred, DE being a customary measure for the reducing effect of a polysaccharide compared to dextrose, which has a DE of 100. It is possible to use both maltodextrins having a DE of between 3 and 20 and dried glycose syrups having a DE of between 20 and 37, as well as what are known as yellow dextrins and white dextrins having higher molar masses in the range of from 2,000 g/mol to 30,000 g/mol. Oxidized derivatives of dextrins of this type are the reaction products thereof with oxidizing agents which are capable of oxidizing at least one alcohol function of the saccharide ring to form a carboxylic acid function.

Oxydisuccinates and other derivatives of disuccinates, preferably ethylenediamine disuccinate, are also suitable cobuilders. In this case, ethylenediamine-N,N'-disuccinate (EDDS) is preferably used in the form of the sodium or magnesium salts thereof. Glycerol disuccinates and glycerol trisuccinates are also preferred in this context. If desired, suitable amounts for use, in particular in zeolite-containing and/or silicate-containing formulations, are from 3 wt. % to 15 wt. %.

Further suitable organic cobuilders are, for example, acetylated hydroxycarboxylic acids or the salts thereof, which optionally can also be present in lactone form and comprise at least 4 carbon atoms and at least one hydroxy group, as well as no more than two acid groups.

Moreover, all compounds that are able to form complexes with alkaline earth ions can be used as builders.

Washing and cleaning agents can contain nonionic, anionic, cationic and/or amphoteric surfactants. A washing agent according to the invention preferably contains nonionic and/or anionic surfactant All non-ionic surfactants that are known to a person skilled in the art can be used as non-ionic surfactants. Particularly preferably, the washing agents contain nonionic surfactants from the group of alkoxylated alcohols. Nonionic surfactants that are preferably used are alkoxylated, preferably ethoxylated, particularly primary alcohols with preferably 8 to 18 C atoms and, on average, 1 to 12 mols of ethylene oxide (EO) per mol of alcohol in which the alcohol residue can be linear or preferably methyl-branched in the 2 position, or it can contain linear and methyl-branched residues in admixture, as are usually present in oxo-alcohol residues. However, alcohol ethoxylates having linear functional groups of alcohols of native origin having 12 to 18 C atoms, for example of coconut alcohol, palm alcohol, tallow fatty alcohol or oleyl alcohol, and an average of 2 to 8 EO per mol of alcohol, are particularly preferred. Preferred ethoxylated alcohols include C12-14 alcohols having 3 EO or 4 EO, C9-11 alcohols having 7 EO, C13-15 alcohols having 3 EO, 5 EO, 7 EO or 8 EO, C12-18 alcohols having 3 EO, 5 EO or 7 EO, and mixtures thereof, such as mixtures of C12-14 alcohol having 3 EO and C12-18 alcohol having 5 EO. The degrees of ethoxylation specified represent statistical averages that can correspond to an integer or a fractional number for a specific product. Preferred alcohol ethoxylates have a narrowed homolog distribution (narrow range ethoxylates, NRE).

In addition to these non-ionic surfactants, fatty alcohols having more than 12 EO can also be used. Examples of these are tallow fatty alcohols having 14 EO, 25 EO, 30 EO, or 40 EO. In addition, alkyl glycosides of the general formula RO(G)x, for example, where R corresponds to a primary straight-chain or methyl-branched aliphatic functional group, in particular an aliphatic functional group that is methyl-branched in the 2 position, having 8 to 22, preferably 12 to 18, C atoms, and G is the symbol that represents a glycose unit having 5 or 6 C atoms, preferably glucose, may also be used as further non-ionic surfactants. The degree of oligomerization x, which indicates the distribution of monoglycosides and oligoglycosides, is any number between 1 and 10; x is preferably between 1.2 and 1.4.

Another class of non-ionic surfactants which are preferably used and which are used either as the sole non-ionic surfactant or in combination with other non-ionic surfactants, are alkoxylated, preferably ethoxylated or ethoxylated and propoxylated, fatty acid alkyl esters, preferably having 1 to 4 carbon atoms in the alkyl chain.

Non-ionic surfactants of the aminoxide type, for example N-cocoalkyl-N,N-dimethylamine oxide and N-tallow-alkyl-N, N-dihydroxyethylamine oxide, and of the fatty acid alkanolamides, may also be used. The quantity of these non-ionic surfactants is preferably no more than that of the ethoxylated fatty alcohols, in particular no more than half thereof.

Further suitable surfactants are polyhydroxy fatty acid amides of the formula

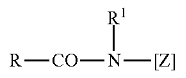

where R represents an aliphatic acyl functional group having 6 to 22 carbon atoms, $R^1$ is hydrogen, an alkyl or hydroxy alkyl functional group having 1 to 4 carbon atoms and [Z] is a linear or branched polyhydroxyalkyl functional group having 3 to 10 carbon atoms and 3 to 10 hydroxyl groups. The polyhydroxy fatty acid amides are known substances that can usually be obtained by the reductive amination of a reducing sugar with ammonia, an alkyl amine or an alkanol amine, and subsequent acylation with a fatty acid, a fatty acid alkyl ester or a fatty acid chloride. The group of polyhydroxy fatty acid amides also includes compounds of the formula,

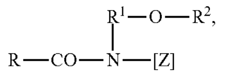

where R denotes a linear or branched alkyl or alkenyl group having 7 to 12 carbon atoms, $R^1$ denotes a linear, branched or cyclic alkyl group or an aryl group having 2 to 8 carbon atoms, and $R^2$ denotes a linear, branched or cyclic alkyl group or an aryl group or an oxy alkyl group having 1 to 8 carbon atoms, wherein $C_{1-4}$ alkyl or phenyl groups are preferred, and [Z] denotes a linear polyhydroxy alkyl group, the alkyl chain of which is substituted with at least two hydroxyl groups, or alkoxylated, preferably ethoxylated or propoxylated derivatives of this group. [Z] is preferably obtained by the reductive amination of a reduced sugar, for example glucose, fructose, maltose, lactose, galactose, mannose or xylose. The N-alkoxy- or N-aryloxy-substituted compounds can then be converted, in the presence of an alkoxide as the catalyst, to the desired polyhydroxy fatty acid amides by reacting these with fatty acid methyl esters.

Non-ionic surfactants from the group of alkoxylated alcohols, particularly preferably from the group of the mixed alkoxylated alcohols and in particular from the group of EO/AO/EO non-ionic surfactants, or the PO/AO/PO non-ionic surfactants, especially the PO/EO/PO non-ionic surfactants, are particularly preferred in cleaning agents. Such (PO/EO/PO) non-ionic surfactants are characterized by good foam control.

Anionic surfactants that are used are those of the sulfonate and sulfate types, for example. Surfactants of the sulfonate type that can be used are preferably $C_{9-13}$ alkylbenzene sulfonates, olefin sulfonates, i.e. mixtures of alkene and hydroxyalkane sulfonates, and disulfonates, as obtained, for example, from $C_{12-18}$ monoolefins having a terminal or internal double bond by way of sulfonation with gaseous sulfur trioxide and subsequent alkaline or acid hydrolysis of the sulfonation products. Also suitable are alkane sulfonates obtained from $C_{12-18}$ alkanes, for example by way of sulfochlorination or sulfoxidation with subsequent hydrolysis or neutralization. Likewise, the esters of α-sulfofatty acids (ester sulfonates) are suitable, for example the x-sulfonated methyl esters of hydrogenated coconut fatty acids, palm kernel fatty acids or tallow fatty acids.

Sulfated fatty acid glycerol esters are further suitable anionic surfactants. Fatty acid glycerol esters shall be understood to mean the monoesters, diesters and triesters and the mixtures thereof, as they are obtained during production by way of the esterification of a monoglycerol with 1 to 3 moles fatty acid or during the transesterification of triglycerides with 0.3 to 2 moles glycerol. Preferred sulfated fatty acid glycerol esters are the sulfation products of saturated fatty acids having 6 to 22 carbon atoms, for example of caproic acid, caprylic acid, capric acid, myristic acid, lauric acid, palmitic acid, stearic acid or behenic acid.

The alkali salts and in particular the sodium salts of the sulfuric acid half-esters of $C_{12}$-$C_{18}$ fatty alcohols, for example from coconut fatty alcohol, tallow fatty alcohol, lauryl alcohol, myristyl alcohol, cetyl alcohol or stearyl alcohol, or of $C_{10}$-$C_{20}$ oxo alcohols and the half-esters of secondary alcohols having these chain lengths are preferred as alk(en)yl sulfates. Alk(en)yl sulfates of the mentioned chain length that contain a synthetic straight-chain alkyl functional group prepared on a petrochemical basis and have a degradation behavior similar to that of the adequate compounds based on fat chemical raw materials are also preferred. From a washing perspective, $C_{12}$-$C_{16}$ alkyl sulfates, $C_{12}$-$C_{15}$ alkyl sulfates and $C_{14}$-$C_{15}$ alkyl sulfates are preferred.

The sulfuric acid monoesters of straight-chain or branched $C_{7-21}$ alcohols ethoxylated having 1 to 6 mol ethylene oxide, such as 2-methyl-branched $C_{9-11}$ alcohols having, on average, 3.5 mol ethylene oxide (EO) or $C_{12-18}$ fatty alcohols having 1 to 4 EO, are also suitable. Due to the high foaming behavior, they are used only in relatively small amounts in cleaning agents, for example in amounts of 1 wt. % to 5 wt. %.

Further suitable anionic surfactants are also the salts of alkyl sulfosuccinic acid, which are also referred to as sulfosuccinates or as sulfosuccinic acid esters and represent monoesters and/or diesters of sulfosuccinic acid with alcohols, preferably fatty alcohols, and in particular ethoxylated fatty alcohols. Preferred sulfosuccinates contain $C_{8-18}$ fatty alcohol groups or mixtures of these. In particular, preferred sulfosuccinates contain a fatty alcohol group that is derived from ethoxylated fatty alcohols, which taken alone represent non-ionic surfactants. Among these, in turn, sulfosuccinates, including fatty alcohol groups that derive from ethoxylated fatty alcohols exhibiting a restricted distribution of homologs, are particularly preferred. Likewise, it is also possible to use alk(en)yl succinic acid having preferably 8 to 18 carbon atoms in the alk(en)yl chain, or the salts thereof.

Further anionic surfactants that can also be used are in particular soaps. Saturated fatty acid soaps are suitable, such as the salts of lauric acid, myristic acid, palmitic acid, stearic acid, hydrogenated erucic acid and behenic acid, and in particular soap mixtures derived from natural fatty acids, such as coconut fatty acids, palm kernel fatty acids or tallow fatty acids.

The anionic surfactants, including the soaps, can be present in the form of the sodium, potassium or ammonium salts thereof, or as soluble salts of organic bases, such as mono-, di- or triethanolamine. The anionic surfactants are preferably present in the form of the sodium or potassium salts thereof, in particular in the form of the sodium salts.

Instead of the above-mentioned surfactants or in conjunction therewith, cationic and/or amphoteric surfactants can also be used.

Cationic active substances which can be used are, for example, cationic compounds of the following formulae:

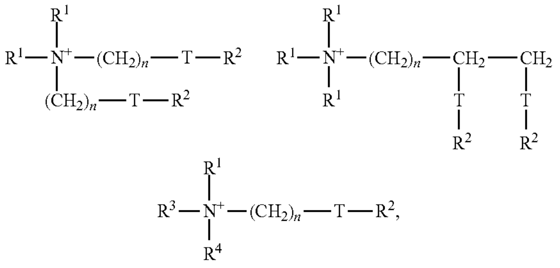

wherein each group $R^1$ is independently selected from $C_{1-6}$ alkyl, alkenyl or hydroxyalkyl groups; each group $R^2$ is independently selected from $C_{8-28}$ alkyl or alkenyl groups; $R^3=R^1$ or $(CH_2)n\text{-}T\text{-}R^2$; $R^4=R^1$ or $R^2$ or $(CH_2)_n\text{-}T\text{-}R^2$; T=—$CH_2$—, —O—CO— or —CO—O— and n is an integer from 0 to 5.

Textile softening compounds can be used for the care of textiles and for improving the textile properties, such as a softer "touch" (conditioning) and reduced electrostatic charge (increased wear comfort). The active ingredients of these formulations are quaternary ammonium compounds with two hydrophobic radicals, such as, for example, the diesteraryl dimethylammonium chloride, which, however, due to its inadequate biodegradability, is increasingly being replaced by quaternary ammonium compounds, which, in their hydrophobic radicals, contain ester groups as predetermined breaking points for biodegradation.

Such "esterquats" with improved biodegradability are obtainable, for example, in that mixtures of methyldiethanolamine and/or triethanolamine are esterified with fatty acids, and the reaction products are subsequently quaternized with alkylating agents in a manner known per se. Dimethylolethylene urea is further suitable as a finishing agent.

Enzymes can be used to increase the performance of washing agents. These include, in particular, proteases, amylases, lipases, hemicellulases, cellulases, perhydrolases, or oxidoreductases, as well as preferably mixtures thereof. These enzymes are in principle of natural origin; starting from the natural molecules, variants that have been improved for use in washing and cleaning agents are available, which are preferably used accordingly. Detergents according to the invention preferably contain enzymes in total quantities of from $1 \times 10^{-6}$ wt. % to 5 wt. % based on active protein. The protein concentration can be determined using known methods, for example the BCA method or the Biuret method.

Among the proteases, subtilisin-type proteases are preferred. Examples of these are the subtilisins BPN' and Carlsberg, as well as the developed forms thereof, protease PB92, subtilisins 147 and 309, the alkaline protease from Bacillus lentus, subtilisin DY, and the enzymes thermitase, proteinase K and proteases TW3 and TW7, which belong to the subtilases but no longer to the subtilisins in the narrower sense.

Examples of amylases that can be used are the α-amylases from Bacillus licheniformis, from B. amyloliquefaciens, from B. stearothermophilus, from Aspergillus niger, and A. oryzae, as well as the further developments of said amylases that have been improved for use in washing and cleaning agents. Others that are particularly noteworthy for this purpose are the α-amylases from Bacillus sp. A 7-7 (DSM 12368) and cyclodextrin glucanotransferase (CGTase) from B. agaradherens (DSM 9948) are to be emphasized.

Lipases or cutinases can be used because of their triglyceride-cleaving activity. These include, for example, the lipases that can originally be obtained from Humicola lanuginosa (Thermomyces lanuginosus) or those that have been developed therefrom, in particular those having the amino acid exchange D96L. Moreover, the cutinases which have been originally isolated from Fusarium solani pisi and Humicola insolens can also be used, for example. Lipases and/or cutinases, the starting enzymes of which were originally isolated from Pseudomonas mendocina and Fusarium solanii, can also be used.

Moreover, enzymes can be used which can be grouped together under the term "hemicellulases." These include, for example, mannanases, xanthan lyases, pectin lyases (=pectinases), pectinesterases, pectate lyases, xyloglucanases (=xylases), pullulanases, and β-glucanases.

In order to increase the bleaching effect, oxidoreductases, such as oxidases, oxygenases, catalases, peroxidases such as halo-, chloro-, bromo-, lignin, glucose, or manganese peroxidases, dioxygenases or laccases (phenoloxidases, polyphenoloxidases), can be used if desired. Advantageously, organic, particularly preferably aromatic compounds that interact with the enzymes are additionally added in order to potentiate the activity of the relevant oxidoreductases (enhancers) or, in the event of greatly differing redox potentials, to ensure the flow of electrons between the oxidizing enzymes and the stains (mediators).

The enzymes can be used in any form established according to the prior art. These include, for example, the solid preparations obtained by means of granulation, extrusion or lyophilization or, in particular in the case of liquid or gel agents, solutions of the enzymes, which are advantageously as concentrated as possible, have a low water content, and/or are admixed with stabilizers. Alternatively, the enzymes can be encapsulated both for the solid and for the liquid administration form, for example by means of spray-drying or extrusion of the enzyme solution together with a preferably natural polymer or in the form of capsules, for example those in which the enzymes are enclosed as in a solidified gel, or in those of the core-shell type, in which an enzyme-containing core is coated with a protective layer that is impermeable to water, air and/or chemicals. Further active ingredients, for example, stabilizers, emulsifiers, pigments, bleaches or dyes can additionally be applied in overlaid layers. Such capsules are made using methods that are known per se, for example by means of vibratory granulation or roll granulation or by means of fluid bed processes. Advantageously, such granules are low in dust, for example due to the application of polymeric film formers, and are stable in storage due to the coating. Furthermore, it is possible to formulate two or more enzymes together such that a single granule exhibits a plurality of enzyme activities.

Preferably, one or more enzymes and/or enzyme preparations, preferably protease preparations and/or amylase preparations, are used in amounts of 0.1 wt. % to 5 wt. %, preferably 0.2 wt. % to 4.5 wt. %, and in particular 0.4 wt. % to 4 wt. %.

Individual fragrance compounds, for example synthetic products of the ester, ether, aldehyde, ketone, alcohol and hydrocarbon types, can be used as fragrances or perfume oils. However, mixtures of different odorants are preferably used which together produce an appealing fragrance note. Perfume oils of this kind can also contain natural odorant mixtures, as are obtainable from plant sources, e.g. pine, citrus, jasmine, patchouli, rose or ylang-ylang oil. If it is to be perceptible, an odorant has to be volatile, with the molar mass, in addition to the nature of the functional groups and the structure of the chemical compound, also playing an important role. Therefore, most odorants have molar masses of up to approximately 200 g/mol, while molar masses of 300 g/mol and above are something of an exception. Due to the differing volatility of odorants, the odor of a perfume or fragrance composed of multiple odorants varies over the course of vaporization, wherein the odor impressions are divided into "top note," "middle note or body" and "end note or dry out." Because the perception of an odor also depends to a large extent on the odor intensity, the top note of a perfume or fragrance is not made up of only highly volatile compounds, whereas the end note comprises for the most part less volatile, i.e., adherent odorants. In the composition of perfumes, more volatile odorants can be bound, for example, to specific fixatives, which prevents them from evaporating too quickly. The division of odorants into "more volatile" or "adherent" odorants below thus provides no information about the impression of the odor and whether the corresponding odorant is perceived as a top note or middle note. The fragrances can be processed directly, but it may also be advantageous to apply the fragrances to carriers, which ensure long-lasting fragrance through slower fragrance release. Cyclodextrins, for example, have been found to be suitable as such carrier materials, it being possible for the cyclodextrin-perfume complexes to be coated with further auxiliaries.

When choosing the colorant, it must be ensured that the colorants are highly stable in storage, are insensitive to light and do not have too strong an affinity for textile surfaces and here in particular for synthetic fibers. At the same time, it must also be taken into account that colorants can have different stabilities with respect to oxidation. In general, water-insoluble colorants are more stable with respect to oxidation than water-soluble colorants. The concentration of the colorant in the washing agents varies depending on the solubility and thus also on the sensitivity to oxidation. In the case of highly water-soluble colorants, colorant concentrations in the range of from a few 10-2 wt. % to $10^{-3}$ wt. % are typically selected. In contrast, in the case of the pigment dyes, which are particularly preferred because of their brightness, but which are less water-soluble, the suitable concentration of the colorant in washing agents is typically a few $10^{-3}$ wt. % to $10^{-4}$ wt. %. Colorants, which can be oxidatively destroyed in the washing process, and mixtures thereof with suitable blue dyes, so-called blueing agents, are preferred. It has proven advantageous to use coloring agents which are soluble in water or at room temperature in liquid organic substances. Suitable examples are anionic colorants, for example anionic nitro dyes.

In addition to the already named components, the washing agents can contain further ingredients which further improve the practical and/or aesthetic properties of these agents. Preferred agents include one or more substances from the group of electrolytes, pH adjusters, fluorescent agents, hydrotopes, foam inhibitors, silicone oils, antiredeposition agents, optical brighteners, graying inhibitors, shrinkage prevention agents, anti-crease agents, dye transfer inhibitors, antimicrobial active ingredients, germicides, fungicides, antioxidants, antistatic agents, ironing aids, phobizing and impregnating agents, swelling and anti-slip agents, and UV absorbers.

A wide number of different salts can be used as electrolytes from the group of inorganic salts. Preferred cations are the alkali and alkaline earth metals, preferred anions are the halides and sulfates. From a manufacturing perspective, the use of NaCl or $MgCl_2$ in the washing agents/washing agents is preferred.

In order to bring the pH of washing agents according to the invention into the desired range, the use of pH adjusters may be indicated. All known acids or alkalis can be used here, provided that their use is not prohibited for practical or ecological reasons or for reasons of consumer protection. The amount of these adjusters usually does not exceed 1 wt. % of the total formulation.

Useful foam inhibitors include soaps, oils, fats, paraffins or silicone oils, which may optionally be applied to carrier materials. Suitable carrier materials are, for example, inorganic salts, such as carbonates or sulfates, cellulose derivatives or silicates, and mixtures of the aforementioned materials. In the context of the present application, preferred agents contain paraffins, preferably unbranched paraffins (n-paraffins) and/or silicones, preferably linear-polymeric silicones, which are structured according to the schema $(R)_2SiO)_x$ and are also referred to as silicone oils. These silicone oils usually represent clear, colorless, neutral, odor-free, hydrophobic liquids having a molecular weight of between 1000 g/mol and 150,000 g/mol and viscosities of between 10 mPa·s and 1,000,000 mPa·s.

Suitable antiredeposition agents are, for example, nonionic cellulose ethers, such as methylcellulose and methylhydroxypropyl cellulose having a proportion of methoxy groups of 15 to 30 wt. % and hydroxypropyl groups of 1 to 15 wt. %, based in each case on the nonionic cellulose ether.

The polymers of phthalic acid and/or terephthalic acid or derivatives thereof, in particular polymers of ethylene terephthalate and/or polyethylene glycol terephthalate or anionically and/or non-ionically modified derivatives thereof, known from the prior art, come as stain repellents. Of these, the sulfonated derivatives of phthalic acid polymers and terephthalic acid polymers are particularly preferred.

Optical brighteners can be added to the washing agents in order to remove graying and yellowing of the treated textiles. These substances are absorbed by the fiber and have a brightening and simulated bleaching effect by converting invisible ultraviolet radiation into visible longer-wave light, the ultraviolet light absorbed from the sunlight being emitted as slightly bluish fluorescence and, together with the yellow tone of the grayed or yellowed laundry, produces pure white. Suitable compounds originate, for example, from the substance classes of 4,4'-diamino-2,2'-stilbene disulfonic acids (flavonic acids), 4,4'-distyryl-biphenylene, methylumbelliferones, coumarins, dihydroquinolinones, 1,3-diarylpyrazolines, naphthalic acid imides, benzoxazole, benzisoxazole and benzimidazole systems and the pyrene derivatives substituted by heterocycles.

The function of graying inhibitors is to keep the dirt that is removed from the fiber suspended in the liquor and in this way prevent redeposition of the dirt. Water-soluble colloids, which are usually organic, are suitable for this purpose, for example the water-soluble salts of polymeric carboxylic acids, sizing material, gelatin, salts of ethersulfonic acids of starch or of cellulose, or salts of acidic sulfuric acid esters of cellulose or of starch. Water-soluble polyamides containing acid groups are also suitable for this purpose. Furthermore, soluble starch preparations can be used, for example degraded starch and/or aldehyde starches. Polyvinylpyrrolidone is also suitable. Cellulose ethers, such as carboxymethyl cellulose (Na salt), methyl cellulose, hydroxyalkyl cellulose, and mixed ethers, such as methylhydroxyethyl cellulose, methylhydroxypropyl cellulose, methylcarboxy methyl cellulose and mixtures thereof, can also be used as graying inhibitors.

Since textile fabrics, in particular made of rayon, viscous staple fiber, cotton and mixtures thereof, can tend to crease because the individual fibers are sensitive to bending, kinking, pressing and squeezing transversely to the fiber direction, synthetic anti-crease agents can be used. These include, for example, synthetic products based on fatty acids, fatty acid esters, fatty acid amides, fatty acid alkylol esters, fatty acid alkylol amides or fatty alcohols, which are mostly reacted with ethylene oxide, or products based on lecithin or modified phosphoric acid esters.

Phobizing and impregnation methods are used for finishing textiles with substances which prevent the deposition of dirt or facilitate its washability. Preferred phobizing and impregnating agents are perfluorinated fatty acids, also in the form of their aluminum and zirconium salts, organic silicates, silicones, polyacrylic esters with perfluorinated alcohol component or polymerizable compounds coupled with perfluorinated acyl or sulfonyl residue. Antistatic agents can also be present. The stain-repellent finishing with phobizing and impregnating agents is often classified as a easy-care finishing. The penetration of the impregnating agents in the form of solutions or emulsions of the active ingredients in question can be facilitated by adding wetting agents which reduce the surface tension. A further field of use of phobizing and impregnating agents is the water-repellent finishing of textile goods, tents, tarpaulins, leather, etc., in which, in contrast to water sealing, the fabric pores are not closed, i.e., the fabric remains breathable (hydrophobization). The hydrophobizing agents used for hydrophobizing coat textiles, leather, paper, wood, etc. with a very thin layer of hydrophobic groups, such as longer alkyl chains or siloxane groups. Suitable hydrophobizing agents are, for example, paraffins, waxes, metal soaps, etc. with additives of aluminum or zirconium salts, quaternary ammonium compounds with long-chain alkyl radicals, urea derivatives, fatty acid-modified melamine resins, chromium complex salts, silicones, organic tin compounds and glutaraldehyde and perfluorinated compounds. The hydrophobized materials do not feel greasy. Nevertheless, as on oiled materials, drops of water drip off from them without wetting. For example, silicone-impregnated textiles are soft to the touch and are water and dirt repellent; stains from ink, wine, fruit juices and the like are easier to remove.

Antimicrobial active ingredients can be used for combating microorganisms. Here, depending on the antimicrobial spectrum and mechanism of action, a distinction is made between bacteriostatic agents and bactericides, fungistatic agents and fungicides. Substances from these groups are, for example, benzalkonium chlorides, alkylarylsulfonates, halophenols and phenol mercuriacetate, wherein these compounds can also be dispensed with entirely.

In order to prevent undesired changes to the washing and cleaning agents and/or the treated textiles caused by the action of oxygen and other oxidative processes, the agent can contain antioxidants. This compound class includes, for example, substituted phenols, hydroquinones, catechols and aromatic amines as well as organic sulfides, polysulfides, dithiocarbamates, phosphites, and phosphonates.

The additional use of antistatic agents can result in increased wear comfort. Antistatic agents increase the surface conductivity and thus enable the charges that have formed to flow off better. External antistatic agents are generally substances having at least one hydrophilic molecular ligand and give the surfaces a more or less hygroscopic film. These mostly surface-active antistatic agents can be divided into nitrogen-containing (amines, amides, quaternary ammonium compounds), phosphorus-containing (phosphoric acid esters) and sulfur-containing (alkyl sulfonates, alkyl sulfates) antistatic agents. Lauryl (or stearyl) dimethylbenzylammonium chlorides are likewise suitable as antistatic agents for textiles or as an additive to washing agents, wherein a conditioning effect is additionally achieved.

Silicone derivatives can be used in textile washing agents to improve the water absorption capacity, the rewettability of the treated textiles and to facilitate the ironing of the treated textiles, They additionally improve the rinsing behavior of washing agents by virtue of their foam-inhibiting properties. Preferred silicone derivatives are, for example, polydialkyl- or alkylarylsiloxanes where the alkyl groups have one to five C atoms and are completely or partially fluorinated. Preferred silicones are polydimethylsiloxanes which may optionally be derivatized and are then amino-functional or quaternized or have Si—OH, Si—H and/or Si—Cl bonds. Further preferred silicones are the polyalkylene oxide-modified polysiloxanes, i.e., polysiloxanes, which have, for example, polyethylene glycols, as well as the polyalkylene oxide-modified dimethylpolysiloxanes.

Finally, UV absorbers may also be used which are absorbed onto the treated textiles and improve the lightfastness of the fibers. Compounds which have these desired properties are, for example, the compounds and derivatives of benzophenone which have substituents in the 2- and/or 4-position and are effective by radiationless deactivation. Substituted benzotriazoles, acrylates (cinnamic acid derivatives) that are phenyl-substituted in the 3-position, optionally having cyano groups in the 2 position, salicylates, organic Ni complexes and natural substances such as umbelliferone and the endogenous urocanic acid are also suitable.

Protein hydrolyzates are other suitable active substances due to their fiber-care action. Protein hydrolyzates are product mixtures that are obtained by acid-, base-, or enzyme-catalyzed degradation of proteins. Protein hydrolyzates of both plant and animal origin may be used. Animal protein hydrolyzates are, for example, elastin, collagen, keratin, silk, and milk protein hydrolyzates, which can also be present in the form of salts. It is preferable to use protein hydrolyzates of plant origin, for example soybean, almond, rice, pea, potato and wheat protein hydrolyzates. Although the use of protein hydrolyzates as such is preferred, amino acid mixtures obtained otherwise or individual amino acids such as, for example, arginine, lysine, histidine or pyroglutamic acid can optionally also be used. It is likewise possible to use derivatives of protein hydrolyzates, for example in the form of their fatty acid condensation products.

The washing agents can be in the form of shaped bodies. In order to facilitate the disintegration of such prefabricated shaped bodies, it is possible to incorporate disintegration aids, so-called tablet disintegrants, into these agents in order to shorten the disintegration times. Tablet disintegrants or disintegration accelerators are understood as meaning auxiliaries which ensure the rapid disintegration of tablets in water or other media and the rapid release of the active ingredients. Disintegration aids can preferably be used in amounts of 0.5 to 10 wt. %, preferably 3 to 7 wt. % and in particular 4 to 6 wt. %, based in each case on the total weight of the agent containing the disintegration aid.

The washing agents described herein can be present in a pre-finished manner in dosing units. Said dosing units preferably comprise the amount of agent necessary for a cleaning cycle. Preferred dosing units have a weight of between 10 g and 50 g, preferably between 15 and 40 g. The volume of the aforementioned metering units and the three-dimensional shape thereof are particularly preferably selected so that the pre-packaged units can be metered via the metering chamber of a washing machine. The volume of the dosing unit is therefore preferably between 10 and 35 ml, preferably between 12 and 30 ml.

The washing agent according to the invention, in particular the prefabricated dosing units, particularly preferably have a water-soluble coating. The water-soluble wrapping, also referred to as "water-soluble casing," is preferably made from a water-soluble film material, which is selected from the group consisting of polymers or polymer mixtures. The wrapping may be made up of one or of two or more layers of the water-soluble film material. The water-soluble film material of the first layer and of the additional layers, if present, may be the same or different. Particularly preferred are films which, for example, can be glued and/or sealed to form packaging such as tubes or sachets after they have been filled with an agent.

The water-soluble packaging may have one or more chambers. The agent may be contained in one or more chambers, if present, of the water-soluble wrapping.

It is preferable for the water-soluble wrapping to contain polyvinyl alcohol or a polyvinyl alcohol copolymer. Water-soluble wrappings containing polyvinyl alcohol or a polyvinyl alcohol copolymer exhibit good stability with a sufficiently high level of water solubility, in particular cold-water solubility. Suitable water-soluble films for producing the water-soluble wrapping are preferably based on a polyvinyl alcohol or a polyvinyl alcohol copolymer of which the molecular weight is in the range of from 10,000 to 1,000,000 g/mol, preferably from 20,000 to 500,000 g/mol, particularly preferably from 30,000 to 100,000 g/mol, and in particular from 40,000 to 80,000 g/mol. Polyvinyl alcohol is usually prepared by hydrolysis of polyvinyl acetate, since the direct synthesis route is not possible. The same applies to polyvinyl alcohol copolymers, which are prepared accordingly from polyvinyl acetate copolymers. It is preferable for at least one layer of the water-soluble wrapping to include a polyvinyl alcohol of which the degree of hydrolysis is 70 mol. % to 100 mol. %, preferably 80 mol. % to 90 mol. %, particularly preferably 81 mol. % to 89 mol. %, and in particular 82 mol. % to 88 mol. %. In addition, a polymer selected from the group comprising (meth)acrylic acid-containing (co)polymers, polyacrylamides, oxazoline polymers, polystyrene sulfonates, polyurethanes, polyesters, polyethers, polylactic acid or mixtures of said polymers may be added to a polyvinyl alcohol-containing film material that is suitable for producing the water-soluble wrapping. Polylactic acids are a preferred additional polymer. Preferred polyvinyl alcohol copolymers include, in addition to vinyl alcohol, dicarboxylic acids as further monomers. Suitable dicarboxylic acids are itaconic acid, malonic acid, succinic acid and mixtures thereof, itaconic acid being preferred. Polyvinyl alcohol copolymers which include, in addition to vinyl alcohol, an ethylenically unsaturated carboxylic acid or the salt or ester thereof, are also preferred. Polyvinyl alcohol copolymers of this kind particularly preferably contain, in addition to vinyl alcohol, acrylic acid, methacrylic acid, acrylic acid ester, methacrylic acid ester or mixtures thereof. It may be preferable for the film material to contain further additives. The film material may contain plasticizers, such as dipropylene glycol, ethylene glycol, diethylene glycol, propylene glycol, glycerol, sorbitol, mannitol or mixtures thereof, for example. Further additives include, for example, release aids, fillers, cross-linking agents, surfactants, antioxidants, UV absorbers, anti-blocking agents, anti-adhesive agents or mixtures thereof. Suitable water-soluble films for use in the water-soluble wrappings of the water-soluble packaging according to the invention are films which are sold by MonoSol LLC, for example under the names M8630, C8400 or M8900. Other suitable films include films by the name of Solublon® PT, Solublon® GA, Solublon® KC or Solublon® KL by Aicello Chemical Europe GmbH or the VF-HP films by Kuraray.

EXAMPLES

Example 1: Preparation of N-dodecanyl-2-(2,4,5,7-tetrabromo-6-hydroxy-3-oxo-3H-xanthen-9-yl) benzamide

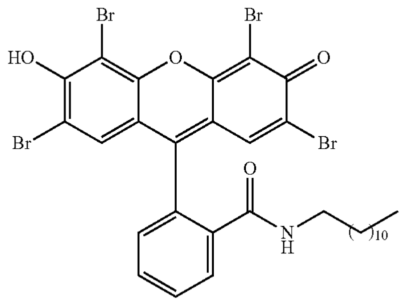

Based on published methods (S. Ficht, L. Röglin, M. Ziehe, D. Breyer, O. Seitz, Direct Carbodiimide-Mediated Conjugation of Carboxylates Using Pyridinium p-Toluenesulfonate and Tertiary Amines as Additives, Synlett 2004, 14, p. 2525-2528; S. M. Bystryak, A. I. Kotel Nikov, G. I. Likhtenshtein, V. I. Nikulin, Luminescence study of intermolecular interactions between excited octadecyleosinamide molecules and solvent molecules in polar and nonpolar solvents, Journal of Applied Spectroscopy 1990, 52, No. 2, p. 158-163), 0.70 g 1-hydroxybenzotriazole (4.30 mmol), 3.24 g pyridinium-p-toluenesulfonate (4.30 mmol), 0.90 g dicyclohexylcarbodiimide (4.30 mmol) and 1.10 g of diisopropylethylamine (8.60 mmol) were added successively with stirring in a round-bottom flask to a mixture of 20 ml of dimethylformamide and 3.00 g of eosin Y (4.30 mmol), After 30 minutes, 0.8 g of 1-dodecylamine (4.3 mmol) was added and the reaction mixture was stirred at room temperature for a further 24 h. The mixture was acidified with dilute aqueous acetic acid and extracted repeatedly with dichloromethane to terminate the reaction. The combined organic phases were dried with magnesium sulfate, filtered, and the solvent was removed from the filtrate under reduced pressure. Subsequently, a column chromatography was carried out on silica gel to purify the crude product; solvents acetone/dichloromethane in a mixing ratio of 1:5 This gave N-dodecyl-2-(2,4,5,7-tetrabromo-6-hydroxy-3-oxo-3H-xanthen-9-yl) benzamide (M1) as a white solid with a yield of 42%.

Example 2: Degradation of β-Carotene

Using a simplified model reaction, the decolorization of the yellow dye β-carotene originating from carrot was visualized and characterized using a UV/VIS spectrum. For this purpose, the same volume fractions of a solution of 0.01 mM β-carotene in chloroform and a solution of 0.0001 mM of the compound M1 prepared in Example 1 were mixed in chloroform and 0.1% diisopropylethylamine in a cuvette, and the cuvette was placed in the Analytik Jena Specord S600 spectrometer. The degradation of the dye β-carotene was determined with the smallest possible distance between the cuvette and a blue-light-emitting LED lamp (450 nm). The data given in Table 1 below resulted.

TABLE 1

Degradation of the dye β-carotene.

| Photoactivator | Absorption maximum (t = 0 min) [a.u.] | Absorption maximum (t = 5 min) [a.u.] | Degradation [%] |
|---|---|---|---|
| —. No DIPEA | 1.70 | 1.44 | 15 |
| —, DIPEA only | 1.70 | 1.44 | 15 |
| M1 + DIPEA | 1.70 | 0.91 | 47 |

The invention claimed is:

1. A washing agent containing 0.00001 wt. % to 1 wt. % N-alkyl-substituted 2-(6-hydroxy-3-oxo-3H-xanthen-9-yl) benzamide of the general formula (I),

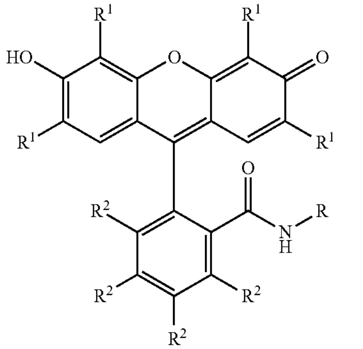

(I)

where R is an optionally substituted linear or branched alkyl radical having 8 to 16 C atoms, each $R^1$ independently represents F, Cl, Br or I, and each $R^2$ independently is H, F, Cl, Br or I; and a nonionic, anionic, cationic and/or amphoteric surfactant.

2. The agent according to claim 1, characterized in that it contains 0.001 wt. % to 0.1 wt. % N-alkyl substituted 2-(6-hydroxy-3-oxo-3H-xanthen-9-yl) benzamide of the general formula (I).

3. The agent according to claim 1, characterized in that it is liquid.

4. The agent according to claim 1, characterized in that it does not contain bleach.

5. The agent according to claim 1, characterized in that it is present as a preprepared dosing unit having a water-soluble casing.

6. A method for removing stains from textile materials, comprising adding a N-alkyl substituted 2-(6-hydroxy-3-oxo-3H-xanthen-9-yl) benzamide of the general formula (I),

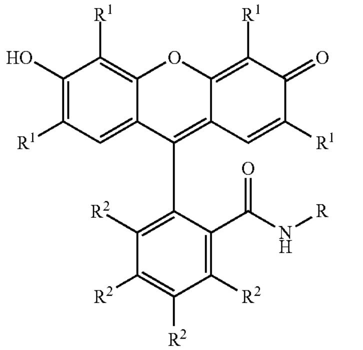

(I)

as photobleaching agent where R is an optionally substituted linear or branched alkyl radical having 1 to 20 C atoms, each $R^1$ independently is F, Cl, Br or I, and each $R^2$ independently is H, F, Cl, Br or I, in an aqueous liquid, which contains soiled textile materials that are in need of a wash, and irradiating the aqueous liquid with visible light to remove stains from the textile materials.

7. The method according to claim 6, characterized in that light in the wavelength range from 400 nm to 600 nm is used.

8. The method according to claim 6, characterized in that the N-alkyl-substituted 2-(6-hydroxy-3-oxo-3H-xanthen-9-yl) benzamide of the general formula (I) is used in concentrations in the range from 0.0001 mmol/l to 0.1 mmol/l in aqueous washing liquids.

9. The agent according to claim 1, characterized in that, in formula (I), the radical R carries substituents selected from —OH, —$COO^-M^+$, —$SO_3^-M^+$, —$OSO_3^-M^+$, —$N^+(CH_2CH_3)_3Hal^-$ and mixtures thereof, where $M^+$ is a proton, an alkali metal ion, an ammonium ion and mixtures thereof and $Hal^-$ is $Cl^-$, $Br^-$, $J^-$, $F^-$ and mixtures thereof and $M^+$ and $Hal^-$ can also be omitted if —$COO^-$, —$SO_3^-$, —$OSO_3^-$ and —$N^+(CH_2CH_3)_3$ is present in a charge-balancing amount; and/or that all radicals $R^1$ are the same and/or in that all radicals $R^2$ are identical.

10. The method according to claim 6, characterized in that, in formula (I), the radical R carries substituents selected from —OH, —$COO^-M^+$, —$SO_3^-M^+$, —$OSO_3^-M^+$, —$N^+(CH_2CH_3)_3Hal^-$ and mixtures thereof, where $M^+$ is a proton, an alkali metal ion, an ammonium ion and mixtures thereof and $Hal^-$ is $Cl^-$, $Br^-$, $J^-$, $F^-$ and mixtures thereof and $M^+$ and $Hal^-$ can also be omitted if —$COO^-$, —$SO_3^-$, —$OSO_3^-$ and —$N_+(CH_2CH_3)_3$ is present in a charge-balancing amount; and/or that all radicals $R_1$ are the same and/or in that all radicals $R^2$ are identical.

11. The method according to claim 6, where R is an optionally substituted linear or branched alkyl radical having 8 to 16 C atoms.

12. The method according to claim 6, characterized in that light in the wavelength range from 250 nm to 525 nm is used.

13. The method according to claim 6, characterized in that the N-alkyl-substituted 2-(6-hydroxy-3-oxo-3H-xanthen-9-yl) benzamide of the general formula (I) is used in concentrations in the range from 0.001 mmol/l to 0.01 mmol/l in aqueous washing liquids which are alkaline.

14. The agent according to claim 1, characterized in that, in formula (I), the radical R carries substituents selected from —OH, —$COO^-M^+$, —$SO_3^-M^+$, —$OSO_3^-M^+$, —$N^+(CH_2CH_3)_3Hal^-$ and mixtures thereof, where $M^+$ is a proton, an alkali metal ion, an ammonium ion and mixtures thereof and $Hal^-$ is $Cl^-$, $Br^-$, $J^-$, $F^-$ and mixtures thereof and $M^+$ and Hal can also be omitted if —$COO^-$, —$SO_3^-$, —$OSO_3^-$ and —$N_+(CH_2CH_3)_3$ is present in a charge-balancing amount; and/or that all radicals $R^1$ are Br and/or in that all radicals $R^2$ are H.

15. The method according to claim 6, characterized in that, in formula (I), the radical R carries substituents selected from —OH, —$COO^-M^+$, —$SO_3^-M^+$, —$OSO_3^-M^+$, —$N^+(CH_2CH_3)_3Hal^-$ and mixtures thereof, where $M^+$ is a proton, an alkali metal ion, an ammonium ion and mixtures thereof and $Hal^-$ is $Cl^-$, $Br^-$, $J^-$, $F^-$ and mixtures thereof and $M^+$ and $Hal^-$ can also be omitted if —$COO^-$, —$SO_3^-$, —$OSO_3^-$ and —$N^+(CH_2CH_3)_3$ is present in a charge-balancing amount; and/or that all radicals $R^1$ are Br and/or in that all radicals $R^2$ are H.

16. A washing agent containing N-alkyl-substituted 2-(6-hydroxy-3-oxo-3H-xanthen-9-yl) benzamide of the general formula (I),

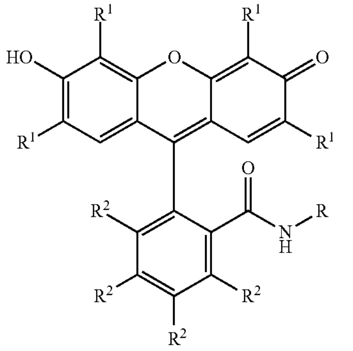

(I)

where R is an optionally substituted linear or branched alkyl radical having 8 to 16 C atoms, each $R^1$ independently represents F, Cl, Br or I, and each $R^2$ independently is H, F, Cl, Br or I; and characterized in that the washing agent is present as a preprepared dosing unit having a water-soluble casing.

17. The agent according to claim 16, characterized in that it contains 0.00001 wt. % to 1 wt. % N-alkyl substituted 2-(6-hydroxy-3-oxo-3H-xanthen-9-yl) benzamide of the general formula (I).

18. The agent according to claim 16, characterized in that it contains 0.001 wt. % to 0.1 wt. % N-alkyl substituted 2-(6-hydroxy-3-oxo-3H-xanthen-9-yl) benzamide of the general formula (I).

19. The agent according to claim 16, characterized in that it is liquid.

20. The agent according to claim 16, characterized in that it does not contain bleach.

* * * * *